United States Patent [19]

Takimoto et al.

[11] Patent Number: 4,493,305

[45] Date of Patent: Jan. 15, 1985

[54] ELECTRONIC FUEL INJECTING METHOD AND DEVICE FOR INTERNAL COMBUSTION ENGINE

[75] Inventors: Toshiyuki Takimoto; Keiji Aoki, both of Susono, Japan

[73] Assignee: Toyota Jidosha Kabushiki Kaisha, Toyota, Japan

[21] Appl. No.: 438,523

[22] Filed: Nov. 1, 1982

[30] Foreign Application Priority Data

Aug. 9, 1982 [JP] Japan ................ 57-138114

[51] Int. Cl.$^3$ .............................................. F02D 5/02
[52] U.S. Cl. .................................. 123/490; 123/476; 123/480
[58] Field of Search ............... 123/490, 476, 478, 480, 123/486, 487

[56] References Cited

U.S. PATENT DOCUMENTS

| | | | |
|---|---|---|---|
| 3,699,932 | 10/1972 | Aono et al. ................ | 123/490 |
| 3,782,338 | 1/1974 | Hayashi et al. ............. | 123/478 |
| 4,069,795 | 1/1978 | Long et al. ................. | 123/487 |
| 4,184,460 | 1/1980 | Harada et al. .............. | 123/491 |
| 4,313,412 | 2/1982 | Hosaka et al. .............. | 123/486 |
| 4,383,515 | 5/1983 | Higashiyama et al. ...... | 123/478 |

Primary Examiner—Andrew M. Dolinar
Attorney, Agent, or Firm—Finnegan, Henderson, Farabow, Garrett & Dunner

[57] ABSTRACT

In an electronic fuel injecting method for an internal combustion engine, wherein fuel injection timings for every groups are controlled in accordance with reference signals variable in the proximity of intake top dead center of a predetermined cylinder and the angle signals variable at every predetermined rotary angles, during a low rotational speed operation of the engine, all of the cylinders perform injections simultaneously in accordance with the angle signals according to the necessity, during a medium rotational speed operation of the engine, group injections with the cylinders being discriminated by the reference signal are performed in accordance with the reference signals and the angle signals, and, during a high rotational speed operation of the engine, group injections with the cylinders being not discriminated by the reference signal are performed in accordance with the angle signals according to the necessity.

7 Claims, 11 Drawing Figures

ELECTRONIC FUEL INJECTING METHOD AND DEVICE FOR INTERNAL COMBUSTION ENGINE

BACKGROUND OF THE INVENTION

1. Field of the Invention

This invention relates to an electronic fuel injecting method and device for an internal combustion engine, and more particularly to improvements in an electronic fuel injecting method and device for an internal combustion engine suitable for use in a motor vehicle engine having a group injection type electronic fuel injecting device and adapted to control fuel injection timings for each group in accordance with reference signals generated in the proximity of intake top dead center of a predetermined cylinder and angle signals generated at every predetermined rotary angles.

2. Description of the Prior Art

Heretofore, there has been adopted a method of using electronic fuel injecting device as one of the methods feeding a mixture of a predetermined air-fuel ratio to combustion chambers in an internal combustion engine such as a motor vehicle engine. Under this method, a plurality of injectors equal to the number of engine cylinders are provided on an intake manifold of the engine to inject fuel into the engine, and valve opening times of the injectors are controlled in accordance with the operating conditions of the engine, so that the mixture of a predetermined air-fuel ratio can be fed to the combustion chambers of the engine.

Three methods of controlling the fuel injection timings of the electronic fuel injecting device are generally known, including a so-called simultaneous injection method in which injectors for every cylinder open their valves all at once in synchronism with rotation of the engine, a so-called group injection method in which, for example, the injectors are divided into two groups and the injectors in each group open their valves all at once, and a so-called sequential injection method in which the injector for each cylinder sequentially opens its valve. Among those, the group injection method can effect fine and close control as compared with the simultaneous injection method, and further, control is simple as compared with the sequential injection method.

In the case of adopting this group injection method, it is a common practice that control is effected on the fuel injection timings for every groups in accordance with reference signals generated in the proximity of intake top dead center of a predetermined cylinder and angle signals generated at predetermined rotary angles, e.g., at every 180°CA (crank angles) in the case of an in-line four cylinders engine. However, in the case of incorporating both a reference signal sensor and an angle signal sensor in a distributor as in the prior art, there occurs a driving region where, particularly, discrimination of the reference signals cannot be accurately carried out due to a magnetic interference between the reference signals and the angle signals, thereby resulting in an improper group injection.

More specifically, a crank angle sensor 8 incorporated in a prior art distrubutor, as shown in FIGS. 1 and 2, is constituted by: two rotors affixed in parallel to a distributor shaft 10, including a reference signal rotor 12 formed on the outer periphery thereof with a projection 12a for emitting reference signals generated in the proximity of intake top dead center of a predetermined cylinder and an angle signal rotor 14 formed on the outer periphery thereof with four projections 14a for emitting angle signals generated at every predetermined rotary angles, for example, at every 180°CA in the case of an in-line four cylinders engine; a reference signal pickup provided around the reference signal rotor 12, for obtaining reference signals from approaching conditions of the projection 12a; and an angle signal pickup 18 provided around the angle signal rotor 14, for obtaining angle signals from approaching conditions of the projections 14a.

For example, varying conditions of the reference signals and the angle signals obtained by the reference signal pickup 16 and the angle signal pickup 18 in the crank angle sensor 8 as described above are shown in FIG. 3. It is apparent from FIG. 3 that, particularly, noise signals owing to the angle signals are caused to the reference signals due to a magnetic interference therebetween. This condition of magnetic interference is variable in accordance with a rotational speed of the engine, and, for example, as shown in FIG. 4, both an output peak voltage level A of the reference signal and an interference noise peak voltage level B caused to the reference signal by the angle signals increase with the increase in the rotational speed of the engine. In consequence, for example, if a judging level Vth for the reference signal is set such that satisfactory reference signals can be obtained in a normal operating region ranging from 500 to 4000 rpm of the engine rotational speed as shown in FIG. 4, then, during a low rotational speed of less than 500 rpm of the engine rotational speed, the reference signal output peak voltage level A becomes lower than the judging level Vth, whereby the reference signal cannot be judged at all, while, during a high rotational speed of more than 4000 rpm of the engine rotational speed, the interference noise peak voltage level B exceeds the judging level Vth, so that the noises are misjudged as the reference signals.

In consequence, heretofore, it has not been able to accurately judge the reference signals during the low and high rotational speed operations of the engine and fuel injections have been performed at erroneous timings, thus possibly lowering the performance of the internal combustion engines.

SUMMARY OF THE INVENTION

The present invention has been developed to obviate the above-described disadvantages of the prior art and has as its first object the provision of an electronic fuel injecting method for an internal combustion engine, capable of carrying out satisfactory fuel injection timing control irrespective of a rotational speed of the engine, so that the original performance of the internal combustion engine can be secured.

The present invention has as its second object the provision of an electronic fuel injecting method for an internal combustion engine, capable of carrying out satisfactory fuel injection timing control during a low rotational speed operation of the engine where the reference signals are detected with difficulty.

The present invention has as its third object the provision of an electronic fuel injecting method for an internal combustion engine, capable of satisfactory group injections during high rotational speed operation of the engine where noise signals caused by the angle signals are possibly mistaken for the reference signals.

The present invention has as its fourth object the provision of an electronic fuel injecting device for an internal combustion engine, capable of achieving the above-described objects.

To achieve the first object, according to the present invention, in an electronic fuel injecting method for an internal combustion engine, wherein fuel injection timings for every groups are controlled in accordance with reference signals generated in the proximity of intake top dead center of a predetermined cylinder and the angle signals generated at every predetermined rotary angles, during a low rotational speed operation of the engine, all of the cylinders perform injections simultaneously in accordance with the angle signals, during a medium rotational speed operation of the engine, group injections with the cylinders being discriminated by the reference signal are performed in accordance with the reference signals and the angle signals, and, during a high rotational speed operation of the engine, group injections with the cylinders being not discriminated by the reference signal are performed in accordance with the angle signals.

To achieve the second object, according to the present invention, in an electronic fuel injecting method for an internal combustion engine like above, during a low rotational speed operation of the engine, all of the cylinders are injected simultaneously in accordance with the angle signals.

To achieve the third object, according to the present invention, in an electronic fuel injecting method for an internal combustion engine like above, during a high rotational speed operation of the engine, group injections with the cylinders being not discriminated by the reference signal are performed in accordance with the angle signals.

To achieve the fourth object, according to the present invention, an electronic fuel injecting device comprises:

an air flow meter to detect an air flow rate of intake air taken in through an air cleaner;

a throttle sensor to detect an opening degree of a throttle valve;

injectors to inject fuel into intake ports provided on respective cylinders of the engine;

a crank angle sensor incorporated in a distributor, for emitting reference signals variable in the proximity of intake top dead center of a predetermined cylinder and angle signals variable at every predetermined rotary angles, respectively, in accordance with rotation of a distributor shaft;

a coolant temperature sensor to detect an engine coolant temperature; and an engine control means, in which basic injection time signals are generated at every predetermined crank angles in accordance with the intake air flow rate fed from the air flow meter and an engine rotational speed obtained from the angle signals fed from the crank angle sensor, the basic injection time signals thus generated are corrected in accordance with the opening degree of the throttle valve fed from the throttle sensor, the engine coolant temperature fed from the coolant temperature sensor and so forth, so as to determine practical injection times, and the engine control means emits valve opening time signals to the injectors that, during a low rotational speed operation of the engine, all of the cylinders are injected simultaneously in accordance with the angle signals, during a medium rotational speed operation of the engine, group injections with the cylinders being discriminated by the reference signal are performed in accordance with the reference signals and the angle signals, and, during a high rotational speed operation of the engine, group injections with the cylinders being not discriminated by the reference signal are performed in accordance with the angle signals.

According to the present invention, the fuel injection timings can be reliably controlled irrespective of a rotational speed of the engine, so that the original performance of the internal combustion engine can be secured.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of the L-J type electronic fuel injecting device of group injection method in a motor vehicle engine, to which the electronic fuel injecting method in an internal combustion engine according to the present invention is applied, with reference to the drawings.

Figure 1:
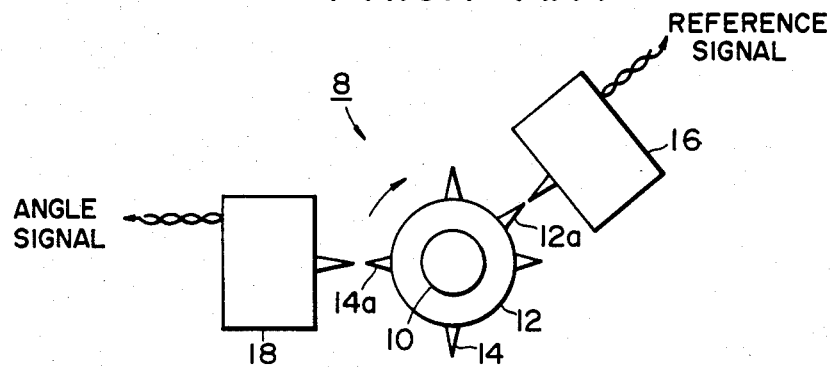
FIG. 1 is a plan view showing the arrangement of the crank angle sensor incorporated in the distributor.
Figure 2:
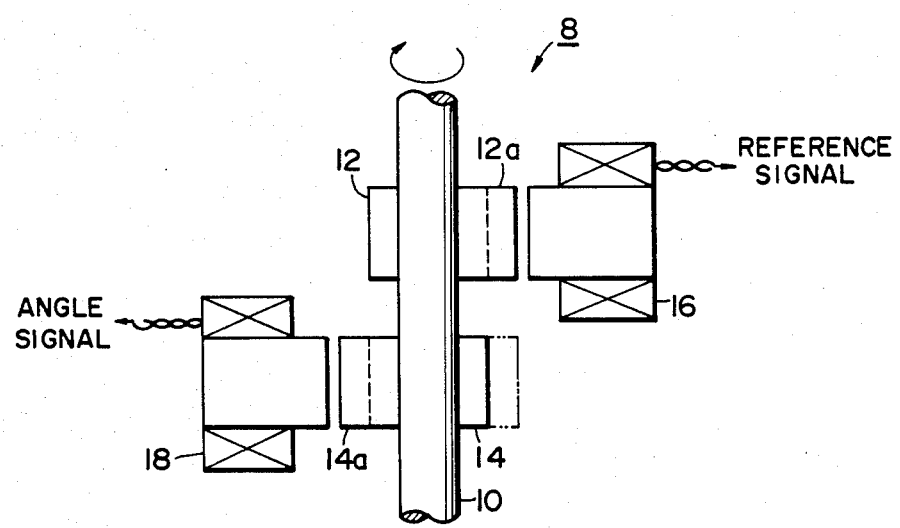
FIG. 2 is a side view thereof.
Figure 3:
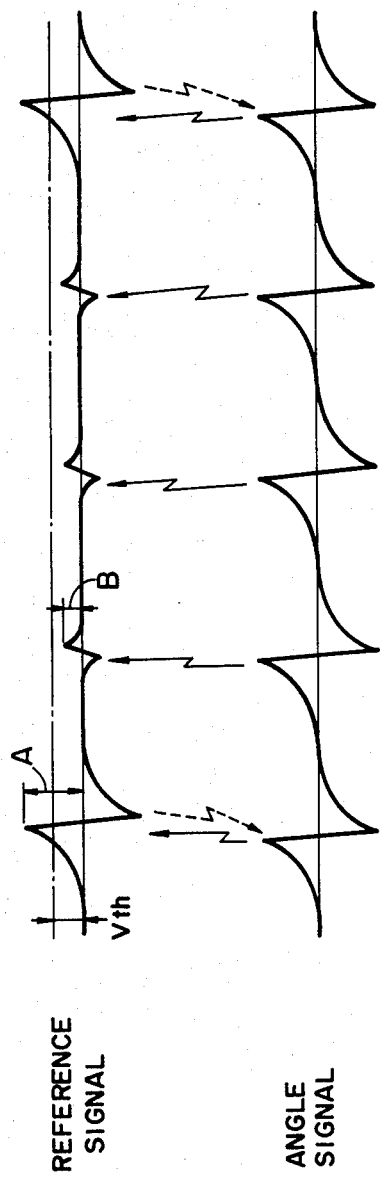
FIG. 3 is a chart showing the conditions of magnetic interference between the reference signals and the angle signals, both of which are fed from the aforesaid crank angle sensor.
Figure 5:
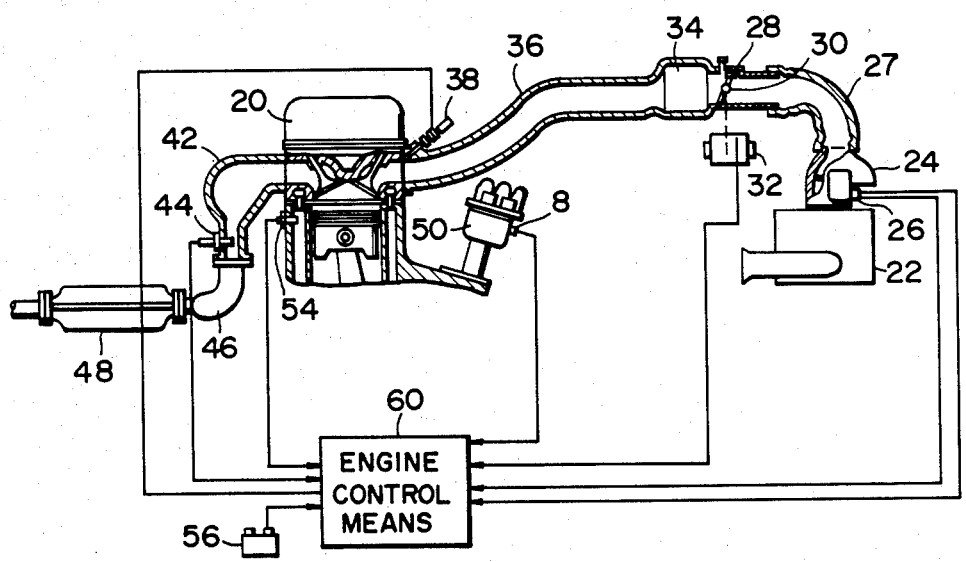
FIG. 5 is a sectional view, with a partial block diagram, showing the general arrangement of an embodiment of an intake air flow rate sensing type, i.e., a so-called L-J type electronic fuel injecting device of group injection method in a motor vehicle engine, to which the electronic fuel injecting method in an internal combustion engine according to the present invention is applied.

As shown in FIG. 5, the present embodiment is of such an arrangement that, in an L-J type electronic fuel injecting device of group injection method in an in-line four cylinders motor vehicle engine 20 comprising:

an air cleaner 22 to take in atmosphere;

an air flow meter 24 to detect an air flow rate of intake air taken in through the air cleaner 22;

an intake air temperature sensor 26 incorporated in the air flow meter to detect a temperature of intake air;

a throttle valve 30 to control an engine intake air flow rate flowing through an intake air passage, provided in a throttle body 28 disposed at the intermediate portion of an intake pipe 27 and adapted to rotate in association with an accelerator pedal, not shown, provided around a driver's seat;

a throttle sensor 32 to detect an opening degree of the throttle valve 30;

a surge tank 34 to prevent the interference of intake air;

injectors 38 to inject fuel into respective intake ports of the engine 20, provided in an intake manifold 36 for respective cylinders;

an oxygen concentration sensor (heretofore referred to as a "$O_2$ sensor") 44 to sense an air-fuel ratio from the residual oxygen concentration in the exhaust gas, provided in an exhaust manifold 42;

a catalytic converter 48 disposed at the intermediate portion of an exhaust pipe 46;

a distributor 50 having a shaft 10, not shown, adapted to make one turn for every two turns of a crankshaft of the engine 20 in association with rotation of the engine 20;

a crank angle sensor 8 as shown in FIGS. 1 and 2, incorporated in the distributor 50, for emitting reference signals generated in the proximity of intake top dead center of a predetermined cylinder and angle signals generated at predetermined rotary angles, e.g., 180°CA, respectively, in accordance with rotation of the distributor shaft 10;

a coolant temperature sensor 54 provided on a cylinder block of the engine 20, for detecting an engine coolant temperature;

a battery 56; and an engine control means 60, in which basic injection time signals are generated at every predetermined crank angles in accordance with the intake air flow rate fed from the air flow meter 24 and an engine rotational speed obtained from the angle signals fed from the crank angle sensor 8, the basic injection time signals thus generated are corrected in accordance with the intake air temperature fed from the intake air temperature sensor 26, the opening degree of the throttle valve fed from the throttle sensor 32, the air-fuel ratio fed from the $O_2$ sensor 44, the engine coolant temperature fed from the coolant temperature sensor 54, the voltage of the battery 56, and so forth, so as to determine practical injection times, and the engine control means 60 emits valve opening time signals to the injectors 38 that, during a low rotational speed operation of the engine where the engine rotational speed is less than 500 rpm which is sensed from the angle signals fed from the crank angle sensor 8, all of the cylinders are injected simultaneously at every 360°CA in accordance with the angle signals, during a medium rotational speed operation of the engine where the engine rotational speed is more than 500 rpm and less than 4000 rpm, group injections with the cylinders being discriminated by the reference signal are performed in accordance with the reference signals and the angle signals, and, during a high rotational speed operation of the engine where the engine rotational speed is more than 4000 rpm, group injections with the cylinders being not discriminated by the reference signal are performed in accordance with the angle signals.

Figure 6:
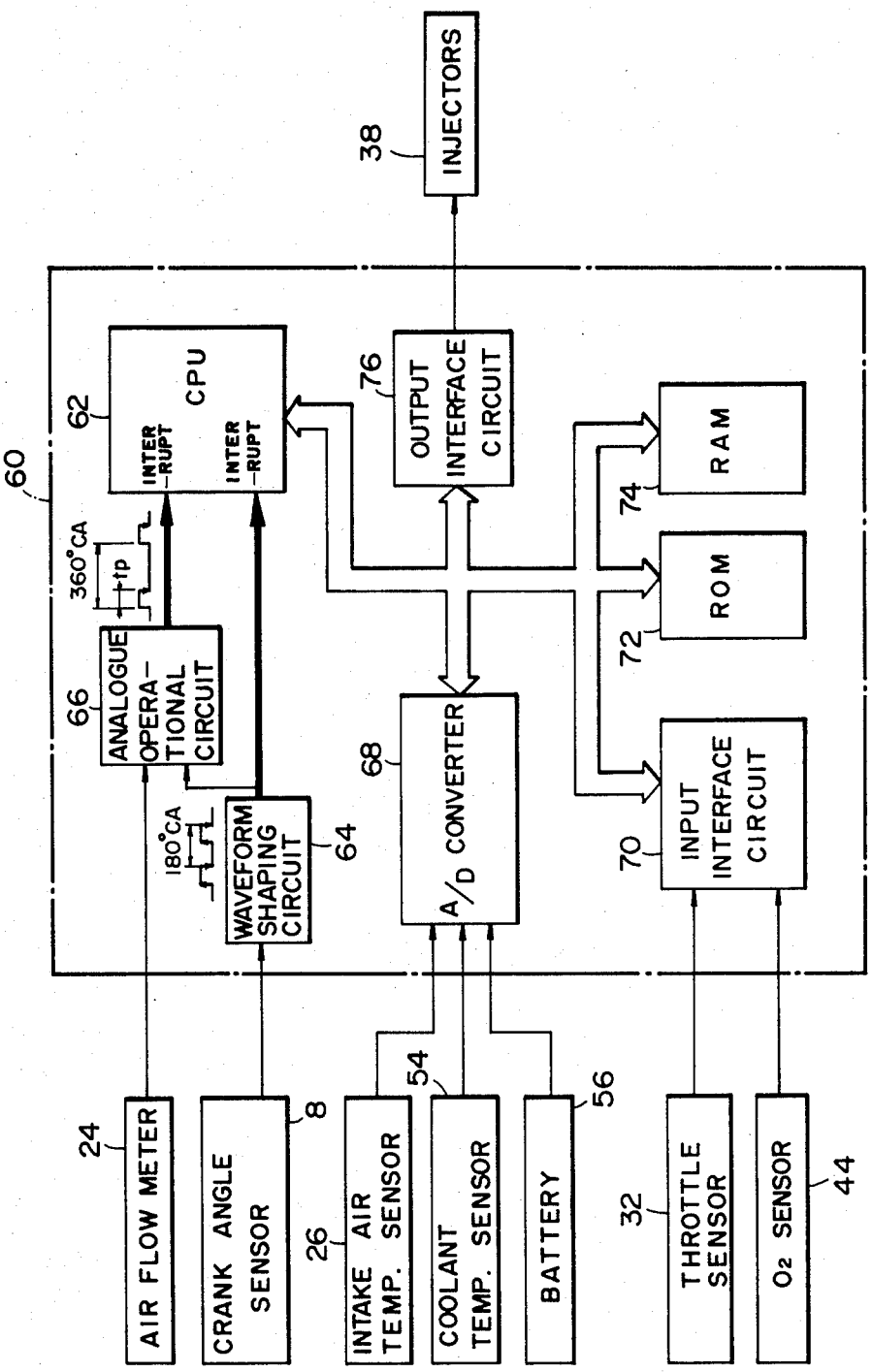
FIG. 6 is a block diagram showing the arrangement of the engine control means used in the aforesaid embodiment.

As detailedly shown in FIG. 6, the aforesaid engine control means 60 comprises:

a Central Processing Unit (hereinafter referred to as the "CPU") 62 consisting of a microprocessor, for example, for performing various operetions;

a waveform shaping circuit 64 for waveform shaping the reference signals and the angle signals fed from the crank angle sensor 8;

an analogue operational circuit 66 for generating basic injection pulses (hereinafter referred to as "tp pulses"), having a basic injection time component of a pulse width tp corresponding to one half of a practical basic injection time, at every 360°CA in accordance with the intake air flow rate signal fed from the air flow meter 24 and the angle signals fed from the waveform shaping circuit 64 at every 180°CA;

an analogue-digital converter (hereinafter referred to as an "A/D converter") 68 for converting into digital signals the intake air temperature signal fed from the intake air temperature sensor 26, the engine coolant temperature signal fed from the coolant temperature sensor 54 and the battery voltage signal fed from the battery 56 and take the same thereinto;

an input interface circuit 70 to take thereinto the throttle valve opening signal fed from the throttle sensor 32 and the air-fuel ratio signal fed from the $O_2$ sensor 44;

a Read Only Memory (hereinafter referred to as the "ROM") 72 to store therein control programs, various data and so forth;

a Random Access Memory (hereinafter referred to as the "RAM") 74 to temporarily store therein operation data in the CPU and the like; and an output interface circuit 76 to emit the valve opening time signals to the injectors 38 in accordance with the results of operation in the CPU.

Description will hereunder be given of action.

Figure 4:
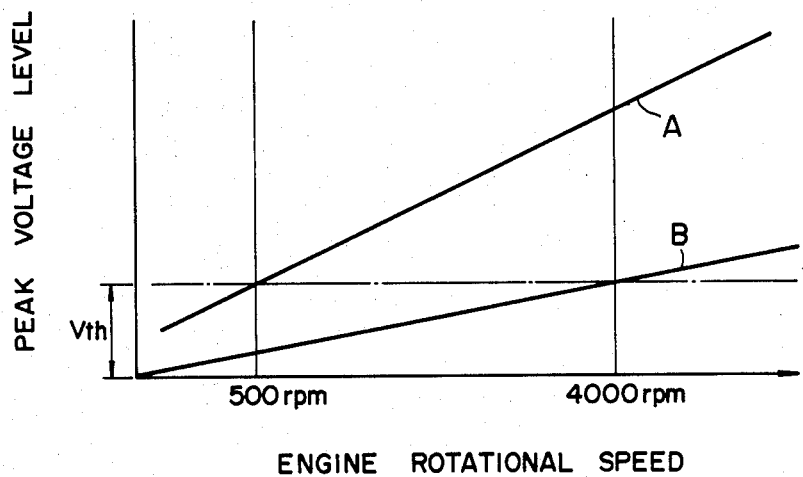
FIG. 4 is a chart showing an example of the relationship between the rotational speed of the engine, the reference signal peak voltage level and the interference noise peak voltage level in the prior art.
Figure 7:
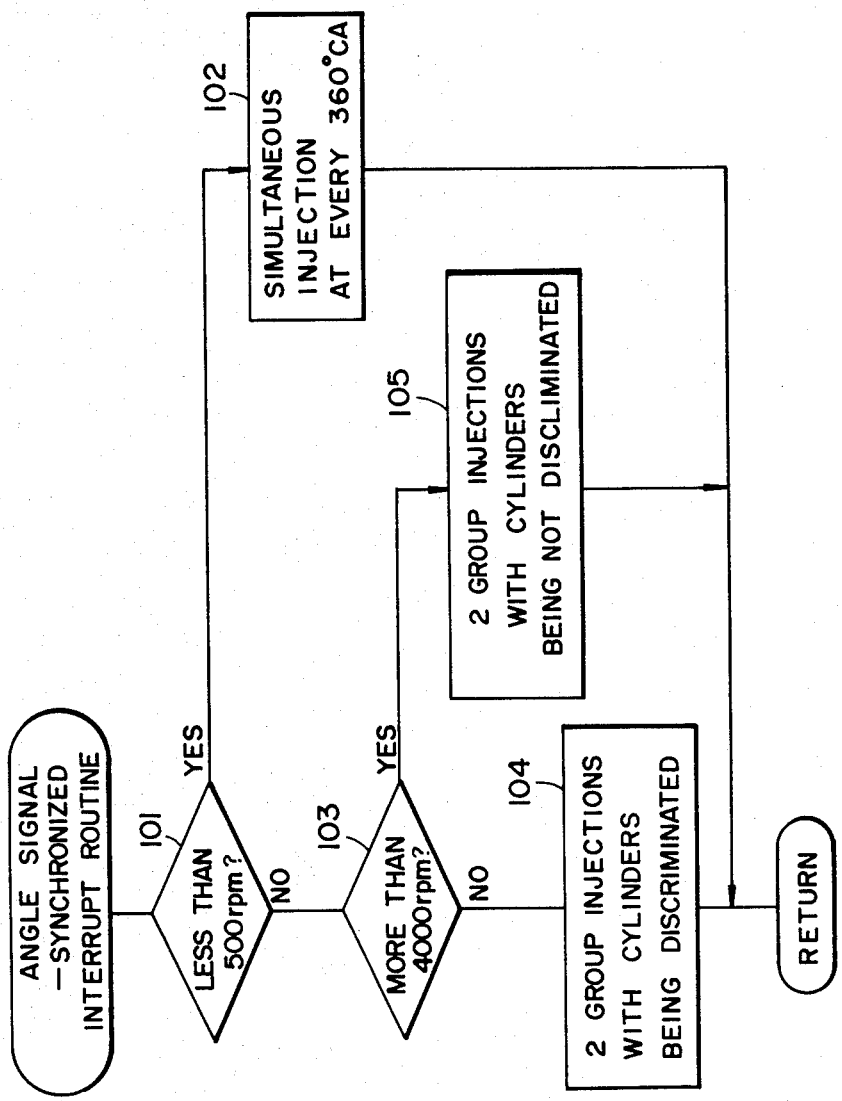
FIG. 7 is a flow sheet showing the basic flow of the angle signal-synchronized interruption process.

The angle signal-synchronized interruption process performed in accordance with the angle signals fed from the crank angle sensor 8 for controlling the fuel injection times in the present embodiment is basically carried out according to the flow sheet shown in FIG. 7. More specifically, firstly, in Step 101, it is judged whether the engine rotational speed is less than 500 rpm or not. When the result of judgement is positive, i.e., when the peak voltage level A of the reference signal is less than the judging level Vth and the reference signal cannot be detected as apparent from FIG. 4, then the process goes forwrd to Step 102, all of the cylinders are injected simultaneously at every two angle signals, i.e., at every 360°CA, in accordance with the angle signals. On the other hand, when the result of judgement in Step 101 is negative, then the process goes forward to Step 103, where it is judged whether the engine rotational speed is more than 4000 rpm. When the result of judgement is negative, i.e., when the engine rotational speed is within the normal driving region ranging from 500 rpm to 4000 rpm, the process goes forward to Step 104, where group injections with the cylinders being discriminated by the reference signal, for example, two group injections are performed in accordance with the reference signals and the angle signals. On the other hand, when the result of judgement in Step 103 is positive, i.e., when an interference noise peak voltage level B exceeds the judging level Vth and the noises caused by the angle signals are possibly mistaken for the reference signals as apparent from FIG. 4, then the process goes forward to Step 105, where group injections with the cylinders being not discriminated by the reference signal, for example, two group injections are performed in accordance with the angle signals.

Figure 8:
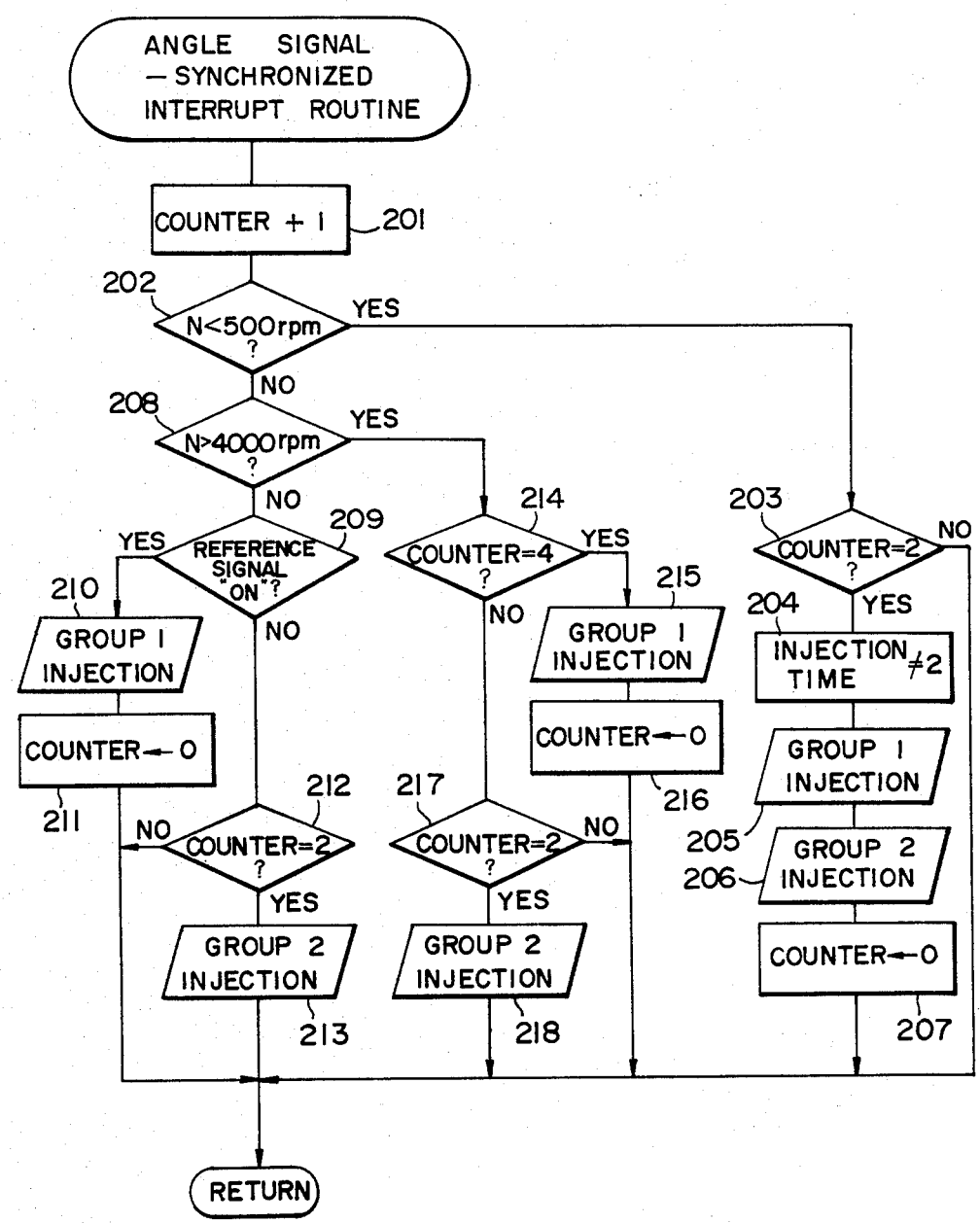
FIG. 8 is a flow sheet showing the specific flow thereof.
Figure 9:
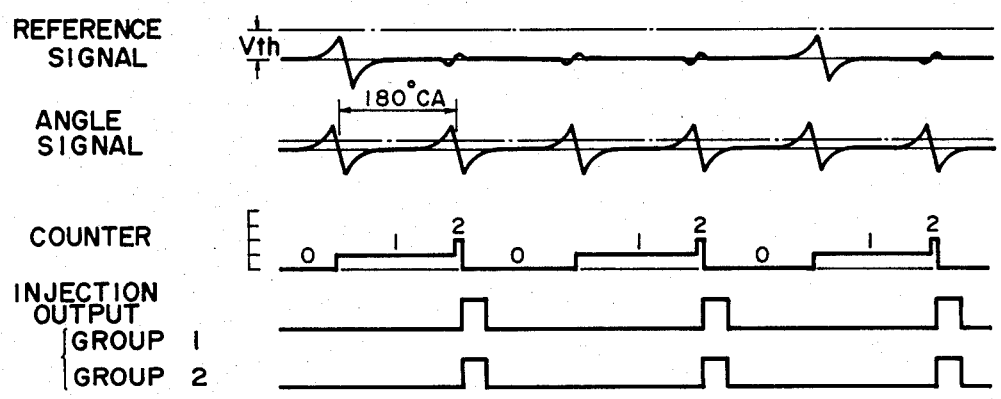
FIG. 9 is a chart showing the signal waveforms in various portions in the aforesaid embodiment when all the cylinders are injected simultaneously.

FIG. 8 more detailedly show the aforesaid angle signal-synchronized interruption process. More specifically, firstly, in Step 201, a counter, which is counted up at every 180°CA in accordance with the angle signals to made grouping, is counted up by one. Subsequently, the process goes forward to Step 202, where it is judged whether the engine rotational speed N is less than 500 rpm or not in the same manner as in Step 101 shown in FIG. 7. When the result of judgement is positive, all of the cylinders are injected simultaneously at every 360°CA. More specifically, in Step 203, it is judged whether the content of the counter is 2 or not, i.e., 360°CA has been passed or not. When the result of judgement is positive, the process goes forward to Step 204, where the fuel injection time, which has been calculated, is made to be ½, and then, in Steps 205 and 206, injections of Group 1 and Group 2 are performed respectively, and all of the cylinders are simultaneously injected. Here, the reason why the fuel injection time is made to be ½ is that, in the case of normal group injections, the fuel injection is performed at every 720°CA. Then, the process goes forward to Step 207, where the counter is cleared, thus ending the control of the simultaneous injections of all cylinders performed at every 360°CA. FIG. 9 shows an example of the control of this simultaneous injection of all cylinders.

Figure 10:
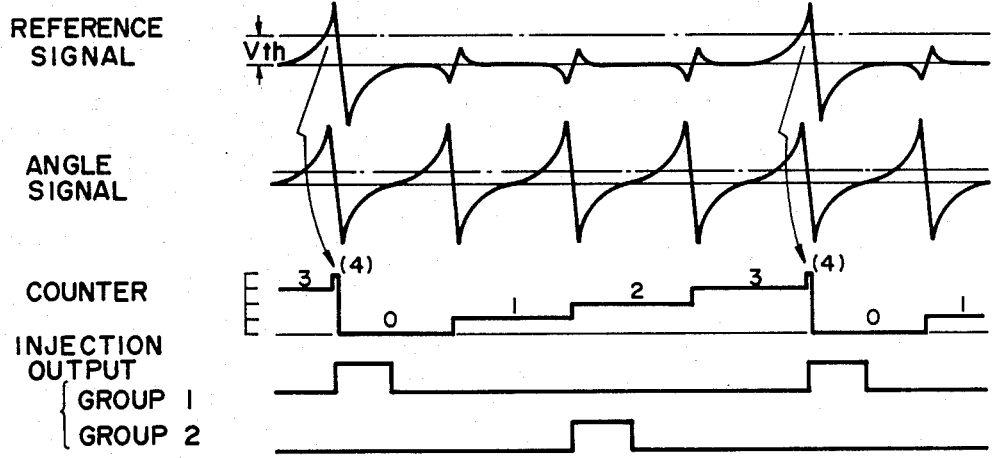
FIG. 10 is a chart showing the signal waveforms in various portions when group injections with the cylinders being discriminated by the reference signal are performed.

On the other hand, when the result of judgement in Step 202 is negative, the process goes forward to Step 208, where judgement is made whether the engine rotational speed N is more than 4000 rpm or not in the same manner as in Step 103 shown in FIG. 7. When the result of judgement is negative, i.e., when the engine rotational speed is within the normal operating region where the engine rotational speed N is more than 500 rpm and less than 4000 rpm, normal group injections are performed. More specifically, firstly, in Step 209, judgement is made whether the reference signal is "ON" or not. When the result of judgement is positive, the process goes forward to Step 210, where only Group 1's injections are performed, and, in Step 211, the counter is cleared. On the other hand, when the result of judgement in Step 209 is negative, the process goes forward to Step 212, where judgement is made whether the content of the counter is 2 or not. When the result of judgement is positive, the process goes forward to Step 213, where Group 2's injections are performed with the cylinders being discriminated by the reference signal. FIG. 10 shows one example of the control of group injections with the cylinders being discriminated. In the present embodiment, the two groups' injections are controlled at every 720°CA by a phase difference of 360°CA.

Figure 11:
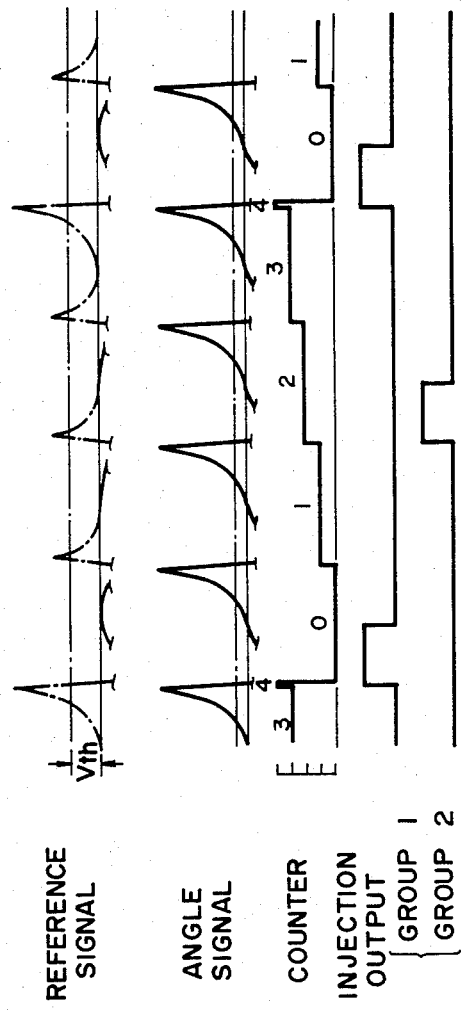
FIG. 11 is a chart showing the signal moveforms in various portions when group injections with the cylinders being not discriminated by the reference signal are performed.

On the other hand, when the result of judgement in Step 208 is positive, i.e., the engine rotational speed N is more than 4000 rpm, the control of group injections is performed with the cylinders being not discriminated by the reference signal in accordance with the content of the counter which has been counted up in response to the angle signals. More specifically, firstly, in Step 214, judgement is made whether the content of the counter is 4 or not. When the result of judgement is positive, the process goes forward to Step 215, where Group 1's injections are performed, and, in Step 216, the counter is cleared. On the other hand, when the result of judgement in Step 214 is negative, the process goes forward to Step 217, where judgement is made whether the content of the counter is 2 or not. When the result of judgement is positive, the process goes forward to Step 218, where Group 2's injections are performed. FIG. 11 shows an example of the control of group injections with the cylinders being not discriminated.

As described above, during the low rotational speed operation of the engine, all of the cylinders are injected simultaneously only in accordance with the angle signals, during the medium rotational speed operation of the engine, the group injections with the cylinders being discriminated by the reference signal are performed in accordance with the reference signals and the angle signals, and, during the high rotational speed operation of the engine, the group injections with the cylinders being not discriminated by the reference signal are performed in accordance with the angle signals, so that satisfactory control of the injection timings can be performed irrespective of the engine rotational speed.

In addition, in the above-described embodiment, the present invention has been applied to an electronic fuel injecting device having a so-called Hybrid type engine control means wherein basic injection pulses are obtained through an analogue operational circuit and corrected by a digital circuit. However, there is no intention to limit the scope of application of the invention to the specific form, but on the contrary, it should be apparent that the invention is also applicable to an electronic fuel injecting device having a digital type engine control means wherein all of the processes are performed digitally.

Furthermore, in the above-described embodiment, the present invention has been applied to an in-line four cylinders motor vehicle engine adopting an L-J type electronic fuel injecting device. However, there is no intention to limit the scope of application of the invention to the specific form, but on the contrary, it should be apparent that, for example, the invention is applicable to an in-line or not in-line six cylinders motor vehicle engine adopting an intake pressure sensing type, i.e., a so-called D-J type electronic fuel injecting device, or to ordinary internal combustion engine as well.

It should be apparent to those skilled in the art that the above-described embodiment is merely representative, which represents the applications of the principles of the present invention. Numerous and varied other arrangements can be readily devised by those skilled in the art without departing form the spirit and the scope of the invention.

What is claimed is:

1. An electronic fuel injecting method for an internal combustion engine with multi-point injection, wherein fuel injection timings for plural groups of injectors are controlled in accordance with reference signals generated in the proximity of intake top dead center of a predetermined cylinder and angle signals generated at predetermined rotary angles, characterized in that, during a low rotational speed operation of the engine as detected by monitoring said angle signals, where said reference signals are detected with difficulty, simultaneous injections of all cylinders are performed in accordance with said angle signals, during a medium rotational speed operation of the engine with the cylinders being discriminated by said reference signal, group injections are performed in accordance with said reference signals and said angle signals, and, during a high rotational speed operation of the engine where noise signals caused by said angle signals are possibly mistaken for said reference signals with the cylinders being not discriminated by said reference signal, group injections are performed in accordance with said angle signals.

2. An electronic fuel injecting method for an internal combustion engine with multi-point injection, wherein fuel injection timings for plural groups of injectors are controlled in accordance with reference signals generated in the proximity of intake top dead center of a predetermined cylinder and angle signals generated at predetermined rotary angles, comprising the steps of detecting low rotational speed of the engine wherein said reference signals are unreliably detected, and performing simultaneous injection on all cylinders upon detection of said low rotational speed.

3. An electronic fuel injecting method for an internal combustion engine with multi-point injection as set forth in claim 2, wherein said simultaneous injections of all cylinders are performed when a peak voltage level of said reference signal is less than a judging level.

4. An electronic fuel injecting method for an internal combustion engine with multi-point injection, including the steps of controlling fuel injection timings for plural groups of injectors in accordance with reference signals generated in the proximity of intake top dead center of a predetermined cylinder and angle signals generated at predetermined rotary angles, detecting a high rotational speed operation of the engine at which noise signals caused by said angle signals exceed a judging level and cylinders are not discriminated by said reference signals, and performing group injections in accordance with said angle signals.

5. An electronic fuel injecting method for an internal combustion engine with multi-point injection as set forth in claim 4, wherein said group injections with the cylinders being not discriminated by said reference signal are performed when peak voltage level of said noise signals exceeds said judging level and said noise signals are possibly mistaken for said reference signals.

6. An electronic fuel injecting method for an internal combustion engine with multi-point injection as set forth in claim 4, wherein said group injections with the cylinders not being discriminated by said reference signal are performed in accordance with the content of a counter which has been counted up in response to said angle signals.

7. An electronic fuel injecting device for an internal combustion engine with multi-point injection, comprising:

an air flow meter to detect an air flow rate of intake air taken in through an air cleaner;

a throttle sensor to detect an opening degree of a throttle valve;

injectors to inject fuel into intake ports provided on respective cylinders of the engine;

a crank angle sensor incorporated in a distributor, for emitting reference signals generated in the proximity of intake top dead center of a predetermined cylinder and angle signals generated at predetermined rotary angles, respectively, in accordance with rotation of a distributor shaft;

a coolant temperature sensor to detect an engine coolant temperature; and an engine control means, in which basic injection time signals are generated at predetermined crank angles in accordance with the intake air flow rate fed from the air flow meter and an engine rotational speed obtained from the angle signals fed from the crank angle sensor, the basic injection time signals thus generated are corrected in accordance with at least the opening degree of the throttle valve fed from the throttle sensor, and the engine coolant temperature fed from the coolant temperature sensor, so as to determine practical injection times, and the engine control means emits valve opening time signals to the injectors that, during a low rotational speed operation of the engine where said reference signals are detected with difficulty, simultaneous injections of all cylinders are performed in accordance with said angle signals; during a medium rotational speed operation of the engine when the cylinders are being discriminated by said reference signal, group injections are performed in accordance with said reference signals and said angle signals; and, during a high rotational speed operation of the engine where noise signals caused by said angle signals are possibly mistaken for said reference signals and cylinders are not discriminated by said reference signals, group injections are performed in accordance with the content of a counter which has been counted up in response to said angle signals.

* * * * *